Patented Sept. 6, 1949

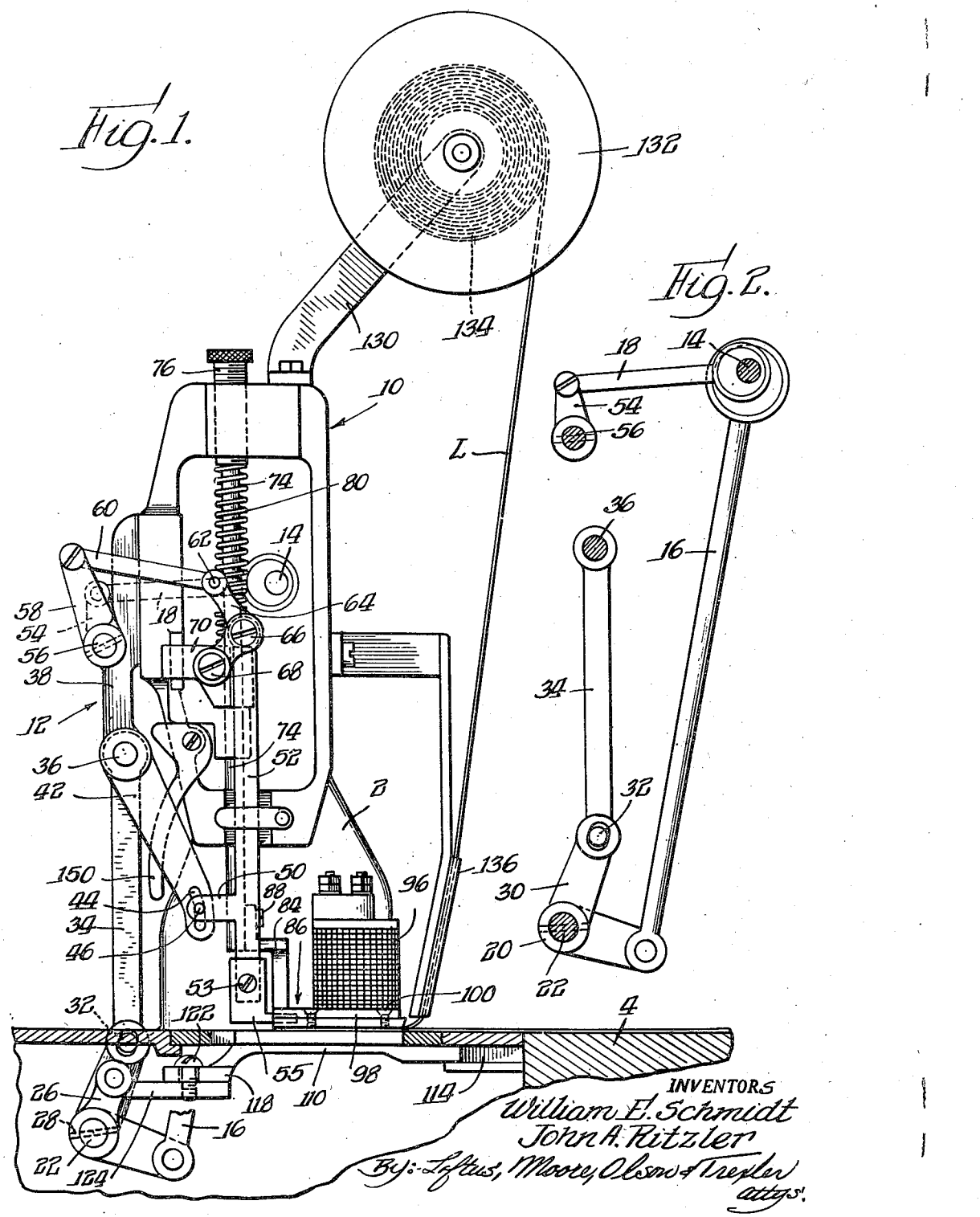

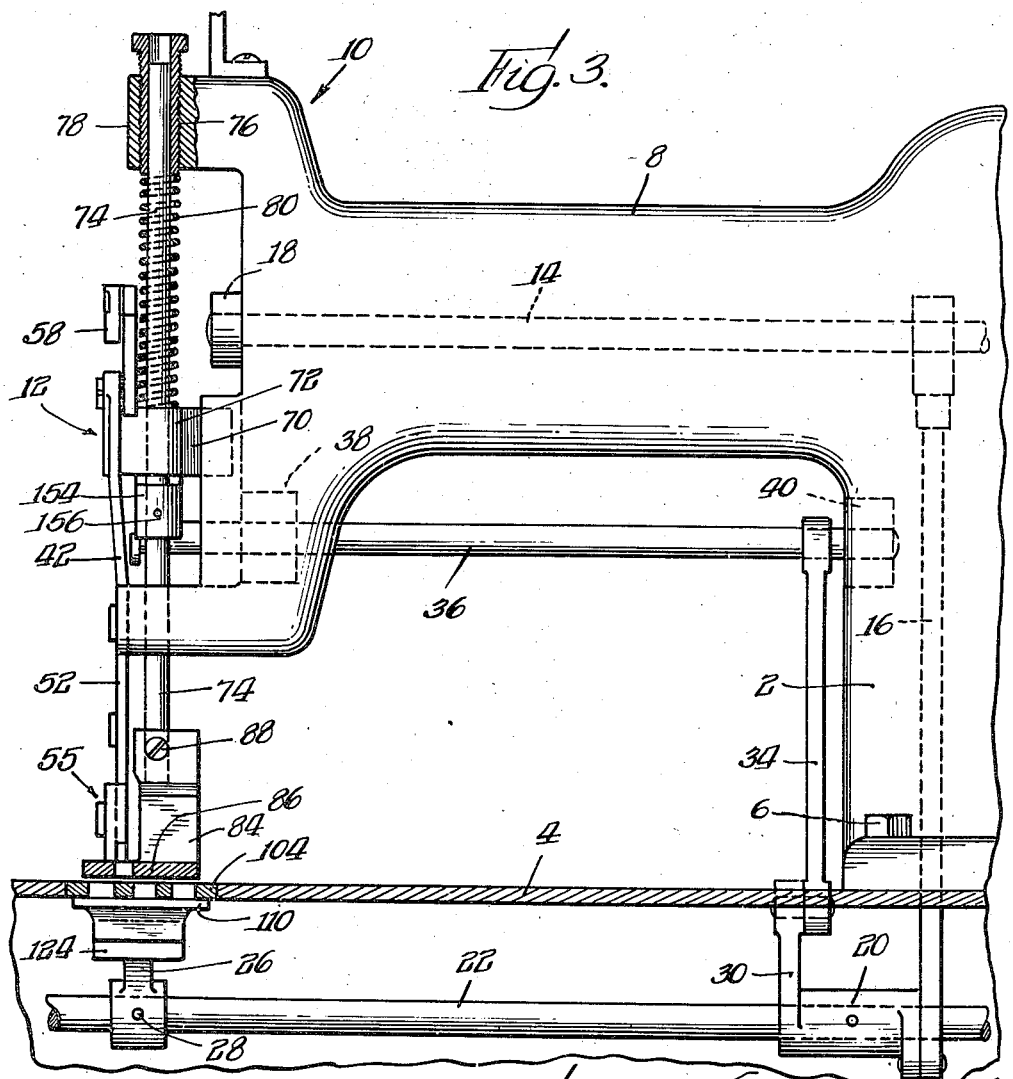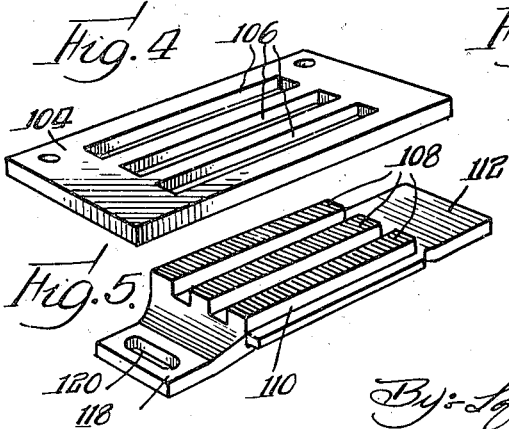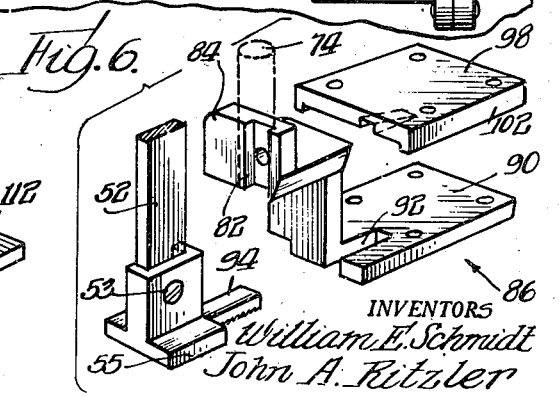

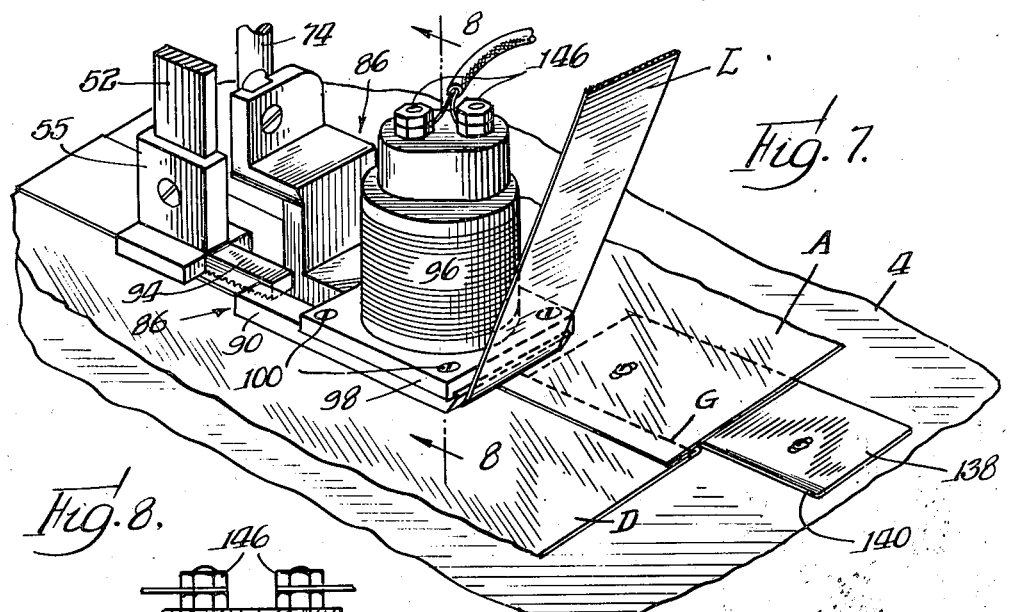
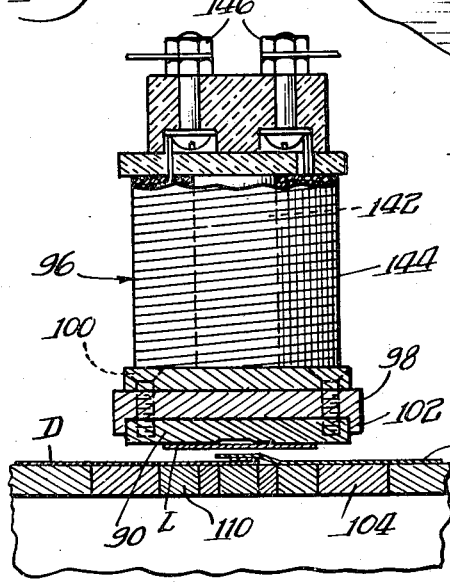
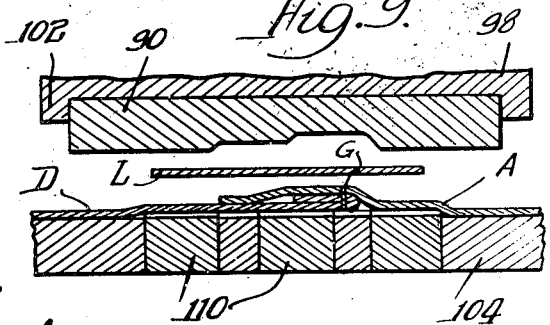
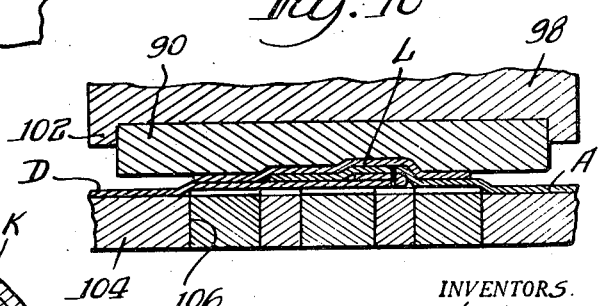
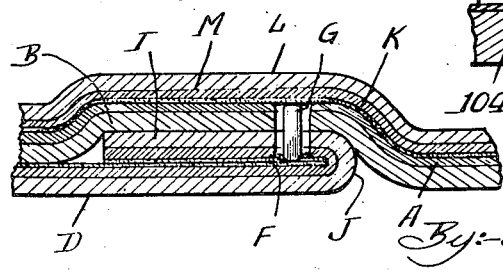

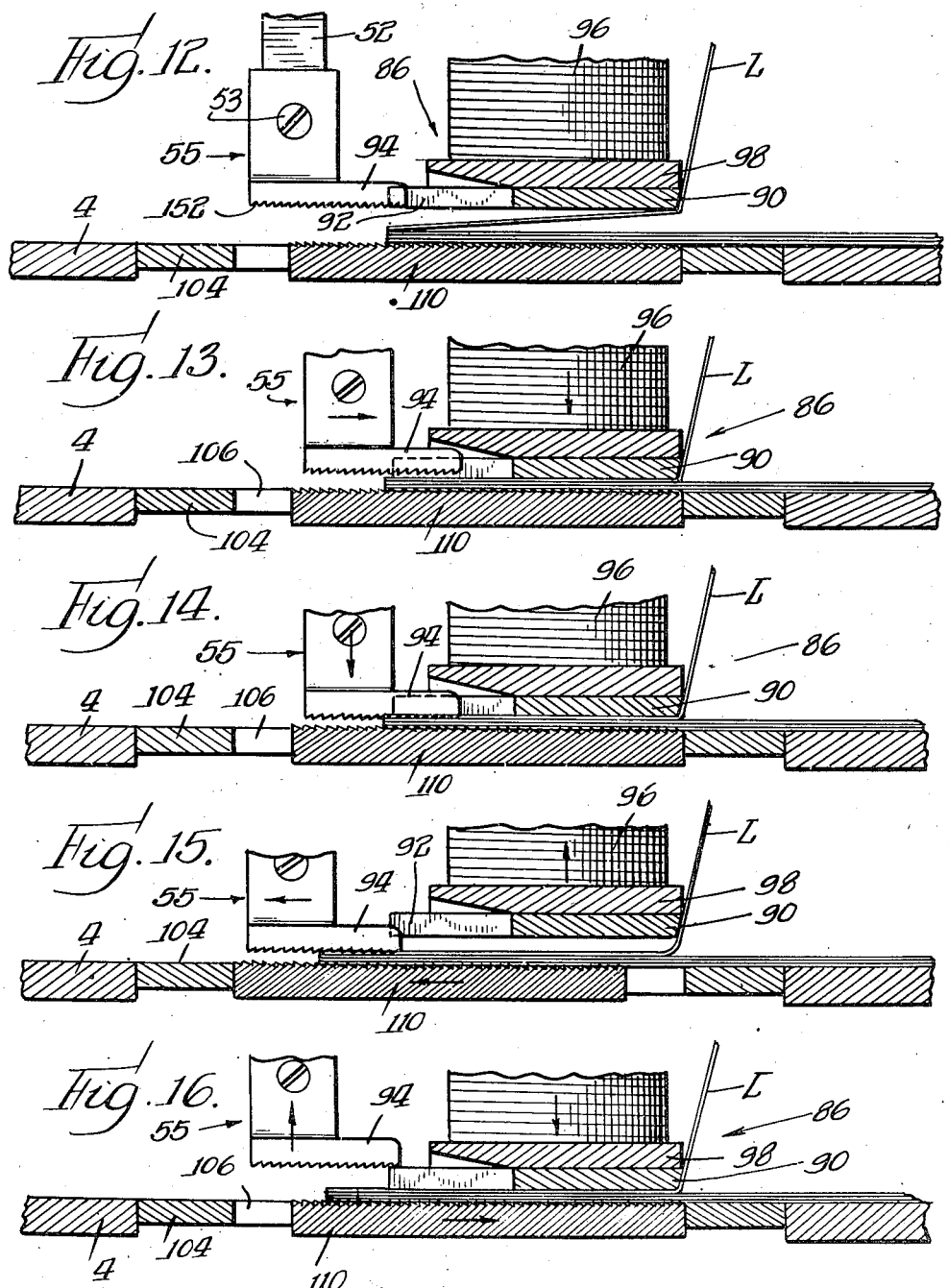

2,480,882

UNITED STATES PATENT OFFICE 2,480,882

MEANS FOR PRODUCING A WATERPROOF SEAM FOR POLYVINYL RESINOUS COATED FABRICS

William E. Schmidt and John A. Ritzler, Three Oaks, Mich., assignors to The Warren Featherbone Co., Three Oaks, Mich., a corporation of Michigan Application June 9, 1944, Serial No. 539,458

1 Claim. (Cl. 154—42.3)

This invention relates to a means and method for forming a sealed, preferably stitched, waterproof seam between two fabrics coated with polyvinyl resinous waterproofing material.

Among the objects of the present invention is to provide a machine and method wherein a stitched, taped seam interconnecting the marginal portions of two fabrics coated with polyvinyl resinous material is sealed or bonded together with a fabric tape likewise carrying a coating of polyvinyl resinous material wherein the sealing is accomplished in a manner such that the seamed fabrics are fed through and by the machine in an uninterrupted intermittent manner whereby the heating member of the pressing means, although at a relatively lower degree of heat, is applied to the same area of the seam to be sealed a predetermined number of times in an intermittent manner whereby to produce an increased heat sealing action so that a better seal or bonded seam is provided and whereby also waterproof fabrics of the type such as that sold under the trade name of "Koroseal" may be effectively sealed or more effectively sealed than with prior machines and with prior processes.

Yet another object of the invention resides in providing an intermittent feed for two pieces of fabric seamed together by polyvinyl resinous waterproofing material wherein heated pressing means is applied to the seamed fabrics to heat seal and bond the same together, the heated pressure plates being applied in an intermittent manner and with associated intermittently operated feeding means whereby the fabric to be seamed is substantially continuously fed through and by the machine while accomplishing an effective heat sealing action on the seam.

A further object of the invention is to provide a process for heat sealing and bonding a taped seam of two fabrics coated with polyvinyl resinous waterproofing material in the manner herein disclosed.

These and other objects of the invention will be apparent from a perusal of the following specification when taken in connection with the accompanying drawings, wherein:

Figure 1 is a front elevational view of the device for heating and pressing the seam;

Figure 2 is a view of part of the linkage used in Figure 1;

Figure 3 is a side elevational view of the machine shown in Figure 1;

Figures 4, 5 and 6 are perspective views of the vibrating pressure foot and associated parts;

Figure 7 is an enlarged perspective view of the heating and feeding devices for heating and pressing and advancing the fabric in the feeding operation;

Figure 8 is a vertical sectional view taken on the line 8—8 of Figure 7;

Figures 9, 10 and 11 are fragmentary detail sectional views showing the seam in the process of being treated; and Figures 12, 13, 14, 15 and 16 show the progressive steps of operation upon the fabric.

The present invention relates to means and method for forming a waterproofed seam between two pieces of waterproofed fabric by means of a polyvinyl waterproofing resin adapted to form a bonded union with the polyvinyl resinous waterproofing coating of the two fabric pieces by means of heat and pressure, and wherein means is provided for applying the heat and pressure through the instrumentalities of mechanisms which also function as the feeding means. The present invention is specifically directed to a mechanism which is adapted intermittently and progressively to heat the surfaces to be pressed together a number of times whereby to effect a progressive curing of the polyvinyl resinous material, and which will also produce incremental feeding of the seamed fabric relatively to the heating and pressing mechanism so as substantially continuously to advance the fabric to be seamed through the heating and pressing mechanism. Due to the fact that the present device applies the heating surface repeatedly to the fabrics being seamed, a lower degree of heat applied over a longer period of time and over a larger area of the seam to be sealed and bonded may be utilized.

In the present invention there are disclosed two pieces of fabric coated on one side with a polyvinyl resinous waterproofing material and which are to be interconnected by means of a waterproof seam. The overlapping edges of these two pieces of waterproofed fabric are stitched preferably in the manner illustrated in the drawings and coated with a marginal coating of polyvinyl waterproofing cement which is allowed to dry, and thereafter a tape of fabric, carrying a coating on its contacting face of preferably the same polyvinyl resinous waterproofing material, is applied to the cement coated stitched seam, and the seam with the tape thus applied is then fed to the heating and pressing mechanism which thereafter automatically heats and presses the seam and the tape between hard metal surfaces with sufficient heat and pressure to cause the flowing of the polyvinyl resinous coating and cement into the interstices and perforations of the seam and the stitching to effect a sealed bonding thereof and at the same time to effect a curing of the polyvinyl resinous material. In the present invention the heating and pressing elements come into clamping engagement above and below the taped seam. The heating element has an independent movement relatively to part of the pressing element and, after an increment of heating, moves upwardly or away from the taped seam, leaving the taped seam clamped between two of the clamping elements disposed above and below. These two clamping elements or pressing elements then move forwardly with the taped seam therebetween to shift the same to impart an incremental feeding movement to the taped seam whereby a fresh untreated portion is then brought into position beneath the path of travel of the heating element and a portion of the previously heated area is moved forwardly, leaving a portion of the previously heated area of the taped seam in the path of movement of the heating element. The feeding element then releases its clamping hold upon the taped seam and returns to its original position, at which time the heating element then again moves onto the taped seam, clamping the same between the heating element and a part of the clamping feeding mechanism, whereupon a second heating and pressing effect is produced, and thereafter the cycle is repeated continuously as the taped seam is heated, pressed and cured, and fed forwardly in a substantially continuous manner. By utilization of an incremental heating and pressing and feeding mechanism, a lower degree of heat may be utilized since the same is applied successively, progressively and intermittently to the taped seam to produce the bonding and curing effect.

The fabric to be seamed is any desired waterproofed sheet material, but preferably a fabric coated with a synthetic polymeric waterproofing material is employed, such as a polyvinyl chloride or polyvinyl butyral. A particularly preferred waterproofing material is a plasticized polyvinyl chloride sold under the trade name of "Koroseal." The sealing strip or tape is a tape formed from this same coated fabric except that the fabric may be a bit lighter, if desired. The tape is of such size as to extend laterally over all of the stitches and to a substantial distance beyond each side of the stitching.

In the formation of the seam two of the pieces of fabric suitably coated with the polyvinyl resinous material are superimposed with edge portions substantially registering and parallel, and with the polyvinyl coatings facing outwardly. In this position the marginal portions, including the zone to be stitched, are preferably given an additional coating of the same type of polyvinyl resinous material in the form of a cement, or one face of the marginal zone through which the stitching is to be formed is given this cement coating. After the cement coating has dried a row of stitching is formed through these two thicknesses of coated fabric and thereafter one of the pieces is swung 180° so that the two pieces then lie in a common plane with their polyvinyl coatings lying uppermost. In this last positioning of the fabrics the stitching forms a pivot about which one of the sheets is adapted to swing into the position shown in Figure 11 of the drawings. Figure 11 shows the two fabrics after they have been stitched and have been arranged with the fabrics lying in a substantially common plane, to be in position to receive the tape. It will be noted that the fabric A has the portion B overlying the folded end I of the fabric D. The folded portions of the cement coating F are facing each other and the stitching perforation passes only through the fabric A and the upper fold I of the fabric D so that the cement coatings F and K of the fabrics D and A, when they flow under heat and pressure, will plug the ends of the perforations. The fabric D forms a fold J due to its having swung about the stitching G. Figure 11 shows the tape L applied with its polyvinyl resinous coating M facing downwardly in contact with the polyvinyl cement K and polyvinyl coating of the upper fabric A and overlying the stitching and the parts of the fabrics on either side of the stitching.

It is to be understood that in certain instances this same seam may be taped without stitching, in which event other types of seams may be utilized. The present type of seam is utilized because it is effectively arranged in that the coating of polyvinyl resinous material is disposed on the two fabrics in such a manner that when heat and pressure are applied this extra application of polyvinyl resinous cement to the polyvinyl coating of the fabric flows sufficiently under the heat and pressure to plug the ends of the perforations formed by the stitching and thereby precludes the passage of moisture through the seam of the fabric and in addition this polyvinyl resinous cement, in combination with the polyvinyl resinous coating of the fabrics, effects a complete sealed and bonded seam between the fabrics of the seam, and in addition the polyvinyl coating of the tape covers the top portion of the seam. Thus the seam is sealed by the fabric tape and the fabric layer D, and the two fabrics A and D and the tape are sealed and bonded together.

Referring now to the drawings in detail, the machine comprises a supporting body portion 2 in the form of a housing mounted on a base or table 4 as at 6 and an extension 8 of the body portion 2 terminates in a head 10 to form a support and enclosure for the operating mechanism 12.

A main drive shaft 14, which is driven from a source of power, is mounted within the extension 8 of the housing 2 and is arranged to operate a vertically disposed pitman rod 16 and also a horizontally disposed pitman rod 18, as shown in Figure 2. Attached to the lower end of the pitman rod 16 is a bell crank lever 20 which is pinned to a lower parallel shaft 22 positioned beneath the table 4, and having a link 26 pinned to its opposite end as at 28, see Fig. 3. The upper arm 30 of the bell crank 20 is slotted to accommodate a pin 32 which connects it to the lower end of a lever arm 34 having its opposite end pivotally supported by a shaft 36 which is mounted on brackets 38 and 40 attached to the side of the machine. In addition, the shaft 36 carries on its outward end a lever 42, as shown in Fig. 1, having its lower end provided with a slot 44, adapted to engage a pin 46 fixed on a right angle extension 50 of a vertically disposed bar 52 which has attached to its lower end as at 53 a shoe 55.

Referring again to the pitman 18, as shown in Figures 1 and 2, the same is connected to a lever 54 which is pinned to a shaft 56 and has pinned on its opposite end another lever arm 58 which in turn is pivotally connected to a link 60 being pivotally attached as at 62 to a bell crak 64, which is also pivotally connected as at 66 to the bar 52. The bell crank lever 64 is pivotally supported as at 68 by connection to a slidable bracket 70.

As will be seen in Figure 3, the bracket 70 is provided with a hub bearing support 72 having a suitable bore to receive a vertically disposed rod 74 which has its upper end slidably positioned in a sleeve 76 which is adjustably threaded in the upper extension 78 of the head 10. A coil spring 80 surrounds the rod 74 and is confined between the lower end of the sleeve 76 and the upper surface of the bearing 72. The lower end of the rod 74 (see Fig. 6) is formed to fit a groove 82 formed on the vertical portion 84 of a pressure plate 86, and both are connected together by a bolt 88.

Formed as part of the pressure plate 86 is a horizontally disposed pressure portion 90 having a slot 92 adapted to receive the projection 94 of the shoe 55 which has sliding engagement therewith during the operation of the machine. Supported on the upper face of the pressure plate 86 is mounted a heating element 96 having a base plate 98 which is suitably attached by means of screws 100 to the pressure plate 90, the base plate 98 having side flanges 102 to overlie the edges of the plate 90.

Positioned directly below the pressure foot 86 is a plate 104 having its upper surface mounted flush with the surface of the table 4 and being attached thereto. The plate 104 is provided with slots 106 through which extend upstanding ridges of a shifting pressing platen 110 which shifts back and forth directly below the plate 104. The ridges 108 are provided with laterally extending teeth which project above the top surface of the plate 104 when assembled. The member 110 is provided with an extension 112 which cooperates with the guideway 114 formed in the base 4, and the opposite end of the member 110 is provided with an extension 118 having a slot 120 to provide a laterally adjustable connection by means of a bolt 122 with an extension 124 of the link 26, see Figure 1. Referring to Figures 9 and 10 it will be noted that the bottom surface of the plate 90 is provided with a longitudinal groove of varying depth to accommodate varying thicknesses of material.

Supported on top of head 10 is a bracket 130 forming a mounting for a reel 132 upon which there is coiled a supply of tape 134. This tape is drawn off the reel as it is being used, and passes through a guide 136 mounted on the side wall of the head 10 and thence downwardly onto the top surface of the material as it is being fed into position under the pressure and heating plate 86 of the machine. A guide plate 138 adjustably positioned to guide the material into the machine is provided with an upstanding edge 140 to contact the fold of the seam J as it is being fed into the machine. See Figure 7.

It will be understood that the heating coil 96 may be of any suitable electrical capacity and may consist of a metal core 142 having numerous turns of resistance wire 144 coiled about it, and having external electrical connections 146 to a source of power for electrical heating.

After the handle 150 is raised, the material with the tape is guided by hand into and under the pressure plate 86 a sufficient distance so that it may be engaged by the shoe 94 which has a series of teeth 152 formed on its undersurface. Upon lowering of the handle 150 the pressure plate and shoe will lower into the position shown in Figure 12 of the drawings. Upon the starting of the source of power the shaft 14 will rotate to cause the pitman rods 16 and 18 to operate their respective links. The pitman 18 shifts the lever 54 to rotate shaft 56 which causes the arm 58 and link 60 to move for oscillating the bell crank 64 about the pivot 68, thereby raising and lowering the bar 52. At the same time the pitman rod 16 causes the bell crank 20 and link 34 to oscillate the shaft 36 which in turn causes the arm 42 to oscillate through a certain number of degrees. This causes the bar 52 to swing back and forth in timed relation with its vertical movement. In addition the bearing block 72 is raised and lowered due to the connection with the bell crank 64. As the bearing block 72 is moved downwardly it comes in contact with a collar 154 pinned at 156 to the rod 74. At this time the spring 80 is applying pressure to the bearing 72, which is transmitted to the collar 154 and then to the rod 74, causing it to apply pressure to the plate 86, as shown in Figure 13. During the time that pressure is applied, heat is also transmitted from the heating coil 96 onto the tape and seam, which are held stationary during this period. The spring tension of the spring 80 is approximately thirty pounds per square inch. It can be more or less, as controlled by the adjustable sleeve 76, depending upon the requirements of the material being pressed.

During this heating and pressing operation the bar 52 is moving inwardly or towards the right and thence downwardly so as to carry the shoe 55 into engagement with the material and tape. At this moment the heated pressure plate 86 begins to rise and release the material so that the foot 94 will engage the material between the bottom teeth 152 and the teeth 108 of the member 110 and clamp the material therebetween. At this moment the pressure plate 86 rises and the bar 52 carrying clamp 94 and fabric feeding member 110 with fabric clamped therebetween, move to the left which is accomplished by the member 110 being connected to the link 26 which is operated by the pitman rod 16.

This movement of the bar 52 and member 110 pulls the tape and material with them a predetermined amount, and then they release the fabric by upward movement of foot 94, as shown in Figure 16, to return to their positions as shown in Figure 12. This operation is continued until the entire piece of material has passed under the heating and pressure plate. During the period of travel the seam which has been formed has been subjected to a series of heating and pressure operations because before any part of the seam has passed out from under the plate 86, the plate will have been raised and lowered a number of times. After the entire length of material has undergone the process of heating and pressure the handle 150 is raised to release the material from under the foot 94 to complete the operation.

It will thus be seen that in accordance with the present invention the two pieces of fabric coated with polyvinyl resinous waterproofed material and carrying additional marginal coatings of cement, have their overlapping edges folded and stitched together, preferably in the manner illustrated in the drawings, and with the tape superimposed on the stitched seam in the manner disclosed. The taped seam is then hand fed into the machine disclosed in the instant application, which machine then proceeds not only to feed the seamed fabrics therethrough with a continuous intermittent feeding movement of successive increments of feed, but also during this feeding the area of the seam engaged by the pressing means is heated between the successive movements of the incremental feed so that any particular area has imparted to it a definite number of intermittent heating and pressing operations which are in turn interrupted by a feeding movement longitudinally of the heating and pressing elements. By reason of this construction a lighter pressing action may be utilized. For instance, the spring pressure in the present machine amounts to substantially thirty pounds to the square inch.

The over-all heating effect applied to the taped seam is preferably greater in this machine than in a machine wherein the taped seam is passed between two rollers, as disclosed and claimed in a companion application filed by Howard H. Haman and John A. Ritzler, on June 9, 1944, Serial No. 539,457, now Patent No. 2,422,676, June 24, 1947, and owned by the common assignee of this application. The greater heating effect produced by the intermittent repeated heating and pressing operation gives, hence, a better sealing effect and therefore can be used to seal material which cannot be as effectively sealed on the before mentioned type of device. For instance, the present type of machine will more effectively seal Koroseal material even though the heating temperature of the heated plate is only 160° F. as compared with 180° F. of the other apparatus. The utilization of a lower temperature heating element in the present machine is permitted because of the repeated application of the heated pressing plate to the same area a number of times, to effect the curing and sealing of the seam even though the heating application is intermittent. For instance, the present machine makes twelve heating impressions to the inch, that is it moves about one twelfth of an inch as a feeding movement, between each two successive heat impressions.

In the present instance attention is called to the fact that the lower platen, between which and the upper pressing foot 86 the seam is held and pressed, is not heated. On the contrary, it remains at room temperature and therefore effects a quicker dissipation of heat and curing of the seam as a result of the heating and pressing operation.

The fabric and the fabric tape may be coated with any type of waterproofing material disclosed in an application filed by Howard H. Haman and Charles E. Whalen contemporaneously herewith entitled "Method of sealing together two pieces of waterproof fabric, and the seam formed thereby," Serial No. 539,456, filed June 9, 1944, now Patent No. 2,406,830, September 3, 1946. Wherever the expression "polyvinyl resinous material" is used it is meant to include all substances disclosed in said application. The heat and pressure can be so regulated as to most efficiently process the particular type of coated fabric that is being used at any particular time.

Obviously the invention is not limited to the specific details of construction disclosed herein but is capable of other modifications and changes without departing from the spirit and scope of the appended claim.

Having thus described our invention what is claimed as new and desired to be secured by Letters Patent is:

An apparatus for interconnecting two pieces of fabric each coated with resin adapted to set upon the application of heat and pressure thereto, comprising in combination a frame, a platen supported on said frame so as to move horizontally thereon, a second platen movable vertically into and out of pressure relationship to said first named platen, a feeder member movable both vertically and horizontally on said frame, means for heating said second platen, means comprising an arm pivotally connected with both said second platen and said feeder member adapted upon a swinging movement in one direction to raise the feeder member by a leverage on said second platen and adapted upon a swinging movement in the other direction to raise said second platen by a leverage on said feeder member, resilient means normally pressing said second platen downwardly, and means comprising a bell crank lever adapted upon an operative stroke to move said feeder member and said first named platen forwardly together with the feeder member in its lowered position.

WILLIAM E. SCHMIDT.
JOHN A. RITZLER.

REFERENCES CITED

The following references are of record in the file of this patent:

UNITED STATES PATENTS

| Number | Name | Date |
|---|---|---|
| 1,097,864 | Knopf et al. | May 26, 1914 |
| 1,560,712 | Naylor | Nov. 10, 1925 |
| 2,120,458 | Bodle | June 14, 1938 |
| 2,253,946 | Waters | Aug. 26, 1941 |
| 2,322,298 | Johnston | June 22, 1943 |
| 2,323,629 | Spanel | July 6, 1943 |
| 2,343,117 | Vincent | Feb. 29, 1944 |
| 2,355,189 | Tozier | Aug. 8, 1944 |

FOREIGN PATENTS

| Number | Country | Date |
|---|---|---|
| 436,774 | Great Britain | Oct. 17, 1935 |

OTHER REFERENCES

A. P. C. Application of Custers, Ser. No. 391,802, published April 27, 1943.